S. J. PEET.

Steam Engine Valves.

No. 4,849. Reissued April 2, 1872.

Witnesses.

Geo. Ropes

F. L. Hale

S. J. Peet.

by his attorney.

F. P. Hale

UNITED STATES PATENT OFFICE.

SAMUEL J. PEET, OF BOSTON, MASSACHUSETTS, ASSIGNOR, BY MESNE ASSIGNMENTS, TO THE PEET VALVE COMPANY.

IMPROVEMENT IN STEAM-ENGINE VALVES.

Specification forming part of Letters Patent No. 60,932, dated January 1, 1867; reissue No. 4,849, dated April 2, 1872.

*To all to whom these presents may come:*

Be it known that I, SAMUEL J. PEET, late of the city, county, and State of New York, but now of Boston, in the county of Suffolk and State of Massachusetts, have invented a new and useful Improvement in Valves; and do hereby declare that the following is a full, clear, and exact description thereof, which will enable others skilled in the art to make and use the same, reference being had to the accompanying drawing forming part of this specification, in which—

Figure 1:
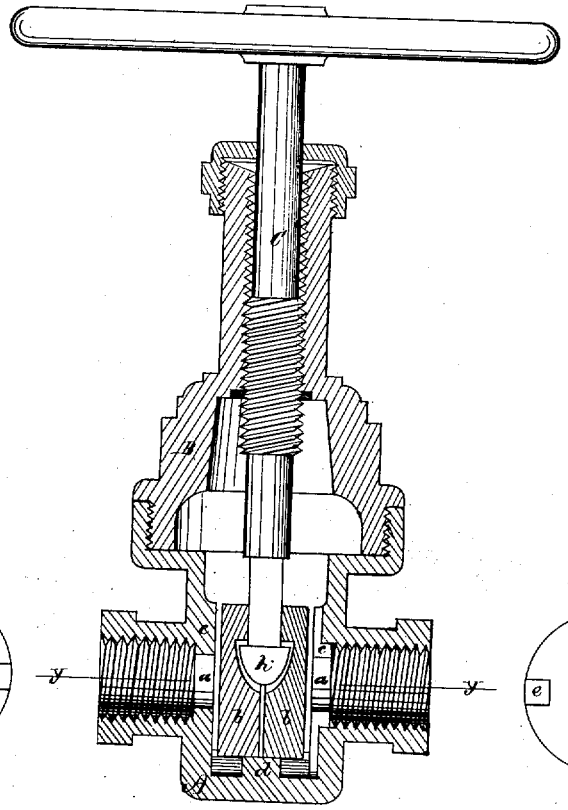
Figure 3:
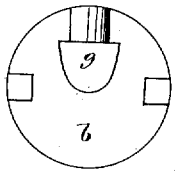
Figure 4:
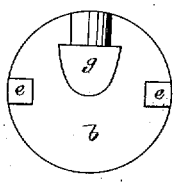
Figure 5:
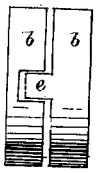
Figure 2:
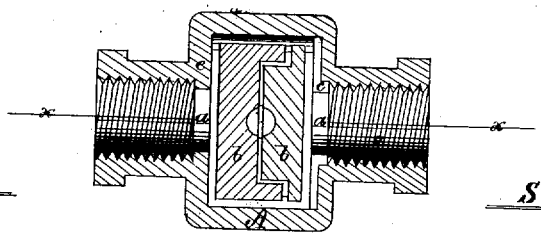

Figure 1 is a central longitudinal section of my improved valve taken in the plane of the line *x x* of Fig. 2. Fig. 2 is a partial transverse section taken in the plane of the line *y y* of Fig. 1. Fig. 3 is a detached view of the inside of one of the double valve-plates or disks. Fig. 4 is a similar view of the corresponding valve-plate or disk. Fig 5 is a detached outside view of the double valve-plates united as employed.

Similar letters of reference indicate like parts.

Prior to my invention there was not, as far as I am aware, in use a stop-valve having two independent disks or gates closing upon two opposite seats.

The disadvantages of a valve having but a single gate are at once obvious; for should any particles of silex or sand get between the gate and its seat the same would cause the valve to leak. Another disadvantage of a valve with but a single gate is, that the eduction-port of the valve, being always open, the chamber of the valve often becomes filled with sediment to such a degree that the gate becomes clogged and impeded in its operation. Another evil is, that the stem of the valve cannot be packed while under pressure.

By constructing the valve with two independent disks or gates and with mechanism, as hereinafter described, for opening and closing them upon their seats all of these difficulties are obviated.

This invention relates to an improvement in valves for steam, gas, compressed air, heated air or caloric, water or other fluids, where a faucet, gate, valve, or cock are used; and consists in a pair of metal disks loosely hung upon an actuating-stem or rod, and so as to work entirely independently of each other, they being so applied to the said stem as to be controlled in their upward and downward movements by a corresponding movement of the stem; such disks being disposed within a box or shell, and so as to close against seats on their opposite sides by a direct lateral movement, the same being effected by means of a conical wedge or a straight wedge turning on a swivel screwed between the disks, or by a sliding wedge or other equivalent device.

In the said drawing, A represents the shell of the valve; B, the cap, through which passes a screw, C, all of which parts are constructed in the ordinary manner of brass or any other suitable material. *a a* denote the steam or water ways, the same passing in a line through the shell at right angles to the screw C, and having flat seats *c c* on the inside of each. In a cavity in the shell A, between the valve-seats *c c*, two flat valve-plates or disks, *b b*, are placed, so as to be opposite to the steam-ways *a a* when operating to close them, and resting in the middle on a projection, *d*, disposed on the bottom of the aforesaid cavity, by which recesses are formed on each side, in order that the edges of the valve-plates shall not strike and become battered when they are forced into place. The valve-plates *b b* are fitted as male and female to each other on dowel-pins *e e*, as shown in Figs. 3, 4, and 5, and in the inner sides of the valve-plates are corresponding taper recesses *g g*, which receive a conical wedge on the end of the screw C, as seen in Fig. 1. The said wedge is shouldered on the upper side, so as to catch on a corresponding shoulder in the recesses *g g* and lift the two independent valve-plates together from their seats *c c* in front of the steam-ways *a a*. The valve-plates are made to lie close together when the wedge *h* is raised, and to play back and forth freely between the valve-seats *c c;* but when the wedge *h* presses against the sides of the recesses *g g* in the valve-plates it spreads them apart and presses their faces in a direct line tightly against the seats *c c* in such manner that steam cannot pass by them either through direct or back action.

It will be observed that with this arrangement of the valve-plates they bear upon the seats and are held rigidly, so that the resistance is positive against the pressure of steam in the ways, and thus closes them perfectly while the operating-wedge is forced into the bottom of the recesses in the valve-plates. It will also be seen that by my construction and operation of the valve or valve-plates they are so hung that their faces do not slide longitudinally or vertically across their seats with that increasing friction incident to the closing of all slide-valves which are closed with a vertical binding rather than a free lateral movement, so as to produce not only wearing of such faces, but also of their seats; but they descend without impinging against the valve-seats until they are brought to a state of rest upon the projection *d*, when a slight turn of the screw forces the wedge between them and moves them laterally directly against the seat, thus saving entirely the great wear incident to the closing of the valve under the old method and as ordinarily constructed. While being moved upward, so as to allow a free passage of the liquid, the valve-plates collapse or close together, so as not to impinge against the valve-seats or the sides of the shell; and when being brought into their normal position for being closed—that is, resting on the top of the projection *d*—such valve-plates are moved in a direct line laterally, so that no abrasion of either the faces of the valve-plates during either their upward or downward movements or that of their seats takes place. And, furthermore, it will be seen that, when the valve-plates are raised in the cavity by the screw, the steam or water-ways are fully open in direct line with each other for the free passage of steam or water.

This valve is equally adapted to any valve for steam, gas, compressed air, heated water, or other fluids where faucets, valves, gates, cocks, or steam-traps are used.

I do not limit myself to application so long as plates or disks constructed on this principle are employed to open and close valves.

I do not claim a sliding stop-valve as made with a single gate; however, such may be constructed, as I employ two gates or disks and close both ports of the valve.

By my construction and arrangement of the valve-gates and their operating mechanism there is no wear of the faces of the gates or those of their seats by one sliding across the other, as my gates descend freely to their lowest position without impinging against the faces of the seats, and are then forced outward against their seats by a direct lateral pressure; whereas in those gates which close upon their seats by a sliding action in the plane of their faces, should any particles of silex or sand get between the gate and its seat, the forcing action of the closing power would plow a channel in the face of either the gate or its seat, and thus destroy their "tight connection." By causing the gates to move in planes parallel to their seats, should any particle or particles of sand become lodged between the gates and their seats, any amount of force brought to bear upon the gate in closing it would simply embed such particles in one or the other of the impacting-surfaces without in the least effecting their perfectly "tight connection."

Having described my invention, what I claim as new, and desire to secure by Letters Patent is—

1. A valve as made with two independent disks or gates to close upon two opposite seats formed on the contiguous ends of the induction and eduction ports, substantially as above set forth.

2. A valve composed of the following elements, viz.: A shell or case, a pair of independent disks or plates, two valve-seats, and intermediate mechanism for opening and closing the said plates upon their seats, substantially as shown and described.

3. In a valve constructed with two independent disks or plates and two valve-seats, a conical or other proper-shaped wedge, as and for the purpose set forth.

4. A valve composed of a shell or case, a pair of independent disks or plates, two valve-seats, and mechanism for closing such plates upon their seats by a direct lateral movement, as and for the purpose set forth.

SAMUEL J. PEET.

Witnesses:
F. P. HALE,
F. C. HALE.